United States Patent

Siddall

[15] 3,700,696

[45] Oct. 24, 1972

[54] BOLL WEEVIL SEX ATTRACTANT
[72] Inventor: John B. Siddall, Palo Alto, Calif.
[73] Assignee: Zoecon Corporation, Palo Alto, Calif.
[22] Filed: Jan. 7, 1970
[21] Appl. No.: 1,305

[52] U.S. Cl.......260/343.5, 260/343.2 R, 260/488 F, 260/617 R
[51] Int. Cl. ................................................C07d 7/06
[58] Field of Search....................................260/343.5

[56] References Cited

UNITED STATES PATENTS 3,119,842   1/1964   Hulcher et al. ......160/343.5 R

Primary Examiner—Alex Mazel
Assistant Examiner—Tighe, Anne Marie T.
Attorney—Donald W. Erickson

[57] ABSTRACT

Synthesis of cis 2-(1'-methyl-2'-iso-propenylcyclobutyl)ethanol, a component of the boll weevil sex attractant, and 3-methyl-pent-2-eno-5-lactone and 2,3-cycloethylene-3-methylpentano-5-lactone which are intermediates therefor.

10 Claims, No Drawings

BOLL WEEVIL SEX ATTRACTANT

The present invention relates to the synthesis of cis 2-(1'-methyl-2'-isopropenylcyclobutyl)ethanol, one of the three essential components of the male boll weevil's sex attractant. More particularly, this invention relates to a novel synthesis of 3-methylpent-2-eno-5-lactone, a key intermediate for the preparation of cis 2-(1'-methyl-2'-isopropenylcyclobutyl)ethanol.

The components of the male boll weevil's sex attractant have been reported at *Chemical & Engineering News*, 36–38 (Apr. 28, 1969) and *Science* 166, 1010 (Nov. 21, 1969).

It is an object of the present invention to provide a synthesis for the preparation of 3-methylpent-2-eno-5-lactone which uses readily available starting materials and is economical to practice. Other objects and advantages will become apparent as the invention is hereinafter described in detail.

Briefly stated, the process of the present invention comprises the metallation of an acetylene of the formula:

wherein R is hydrogen, metal or an acid labile organic group; carboxylation of the metalated product; conjugate methylation of the carboxylate salt; and lactonization of the methylated product to yield 3-methylpent-2-eno-5-lactone (II).

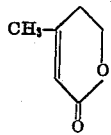

In the practice of the process outlined above, an acetylene of formula I is metalated by treatment with lower alkylmagnesium halide (bromide, chloride or iodide) or lower alkyl lithium in an organic solvent medium salt inert to the reaction. The metallation is accomplished using a molar equivalent or more of the Grignard or lower alkyl lithium in the case of where R is a metal or acid labile organic group and two molar equivalents or more in the case where R is hydrogen. Suitable organic solvents include the ethers, such as ethyl ether, tetrahydrofuran, dioxane, monoglyme, diglyme, and the like, which can be used with a co-solvent, such as the hydrocarbons, e.g. benzene. The reaction is generally carried out from about 0° C to reflux, although lower temperatures of the order of –20° C can be used depending upon the reactants, solvent and solubility. For example, in the use of lower alkyl lithium, lower temperatures of the order of room temperature to 0° are generally used than in the case of lower alkyl-magnesium halides.

The metalated product is then treated with carbon dioxide to yield the carboxylate salt. This reaction is generally carried out at about room temperature or lower and in the same or different solvent medium than the first step of the process, preferably in the same solvent medium without isolation of the metalated product. Carbon dioxide can be introduced by bubbling a stream of carbon dioxide into the reaction medium or by contact with solid carbon dioxide, such as by the addition of dry ice.

Conjugate methylation of the carboxylate salt is next accomplished by treatment with a methylating reagent selected from a complex formed from cuprous salt, a solubilizing ligand and methylmagnesium bromide, chloride or iodide; dimethyl copper lithium; and methylcopper. There is employed one molar equivalent or more of the methylating reagent. The preparation of dimethyl copper lithium is carried out at low temperatures of the order of about room temperature to about –150° C, generally from about 0° C to about –100° C in an organic solvent medium inert to the reaction, such as the ethers, hydrocarbons, and the like, e.g. pentane, ether, tetrahydrofuran, monoglyme, toluene, diglyme and dioxane, and mixtures thereof. Instead of isolating the methylating reagent, it is preferable to add the solution of the methylating reagent to the reaction product medium of the carboxylate salt while maintaining the low temperature and preferably under inert atmosphere or add the carboxylate salt to the solution of methylating reagent. The reaction is complete in a manner of minutes to a few hours depending primarily on the solvent medium. Methyl copper and the complex formed from the reaction of cuprous salt, a solubilizing ligand and methylmagnesium halide are similarly prepared at low temperature. "Cuprous salt," as used herein, refers to cuprous iodide, cuprous bromide, cuprous chloride, cuprous acetate and cuprous cyanide. Methyl copper is prepared using about equimolar amounts of a cuprous salt and methyl lithium. The complex formed from cuprous salt and methylmagnesium halide is prepared using a tertiary phosphine, tertiary phosphite, secondary amine or tertiary amine ligand to solubilize the methylating reagent. Suitable ligands include tri-n-butyl, phosphine, triethylphosphite, pyrrolidine, piperidine, trimethylphosphine, diethyl-amine, tetramethylethylenediamine, and the like. The ligand should be present in the amount of at least one molar equivalent based on the cuprous salt when used with dimethylcopper or methylcopper; however, in the case of the complex formed from about equimolar amounts of cuprous salt and methylmagnesium halide, two or more molar equivalents of the ligand should be employed. In order to solubilize the methylating reagent, additional ligand should be present when the carboxylate salt is derived from the metallated product prepared using a Grignard and R is a metal cation, such as magnesium. Preparation of methylating reagents is described by Siddall et al., *Journal of the American Chemical Society*, 1853 (Mar. 16, 1969) and copending application Ser. No. 815,482, filed Apr. 11, 1969, the disclosure of which is incorporated by reference.

After preparation of the methylated product is complete, the reaction mixture is made acid by the addition of an inorganic or organic acid to accomplish hydrolysis and cyclization (lactonization). An acid, such as hydrochloric acid, sulfuric acid, phosphoric acid, oxalic acid, acetic acid, p-toluenesulfonic acid, perchloric acid and trifluoroacetic acid is suitable. Generally, a dilute aqueous acid, such as aqueous hydrochloric acid, is employed. The acid treatment is generally done at room temperature with stirring, although lower or higher temperatures, such as 0° C to reflux, may be used depending on such factors as the particular acid employed, solvent medium and the time within which it is desired to complete lactonization.

The lactone (II) by treatment with ethylene under photochemical addition conditions yields the 2,3-cycloethylene-3-methylpentano-5-lactone (III) which can be cleaved and converted into cis 2-(1'-methyl-2'-isopropenylcyclobutyl)ethanol.

Photochemical addition of ethylene to the lactone (II) is accomplished by irradiating a solution of the lactone in an organic solvent inert to the reaction which is saturated with ethylene. Suitable inert organic solvents include ethers, alcohols, halogenated hydrocarbons and hydrocarbons, such as ether, tetrahydrofuran, benzene, hexane, cyclohexane, and the like. Depending upon the concentration of the reaction solution, temperature, solvent and light source, the reaction is complete within a few minutes to several hours. The effective wavelength appears to be in the uv range of from about 200 mu. to about 400 mu. The source of light can be sunlight or electrical means, such as fluorescent light, mercury arc light, and the like. Filters, such as pyrex and corex can be used in conjunction with sensitizers, such as acetophenone, benzophenone, and the like. The photochemical addition is generally carried out at room temperature, although higher and lower temperatures can be employed. The concentration of the lactone (II) in the solvent medium should always be considerably less than the concentration of ethylene, generally a concentration of less than 5 percent.

The term "lower alkyl," as used herein, refers to an alkyl group of one to six carbon atoms, straight or branched chain, such as methyl, ethyl, n-propyl, i-propyl, and the like. The term "metal," as used herein, refers to the alkali metal and alkaline earth metals, such as sodium, potassium, lithium, magnesium, calcium, strontium, and the like. The term "acid labile organic group," as used herein, refers to conventional organic groups used to protect a hydroxyl which are hydrolyzed under acid conditions, such as tetrahydropyran-2-yl, tetrahydrofuran-2-yl, t-butyl, and the like. Acetylenes of formula I are commercially available or can be prepared by procedures in the literature, such as U.S. Pat. No. 3,354,152; R.A. Raphael, "Acetylenic Compounds in Organic Synthesis," Butterworth & Co., London (1955); and T.F. Rutledge, "Acetylenic Compounds," Reinhold Book Corp., N. Y. (1968).

The following examples are provided to illustrate the present invention.

EXAMPLE 1

A solution of 10 g. of 4-(tetrahydropyran-2'-yloxy)-but-1-yne and on molar equivalent of ethylmagnesium bromide in 50 ml. of tetrahydrofuran is refluxed for about two hours. The reaction mixture, containing the metalated product, is cooled to room temperature and then carbon dioxide is bubbled in until formation of the carboxylate salt is complete as followed by thin layer chromatography. The reaction mixture is lowered to −78° and then one molar equivalent of dimethyl copper lithium (prepared from cuprous iodide and methyl lithium in tetrahydrofuran at 0°) is added under argon atmosphere. After about two hours, 2 ml. of water is added and the mixture allowed to rise to room temperature. The reaction mixture is made acidic by the addition of aqueous hydrochloric acid and then stirred until hydrolysis and lactonization is complete. The reaction mixture is then extracted with methylene chloride. The methylene chloride extracts are washed with water and brine, dried over magnesium sulfate and concentrated under reduced pressure. The concentrate is distilled to yield 3-methylpent-2-eno-5-lactone (II).

EXAMPLE 2

A mixture of 5 g. of 4-hydroxybut-1-yne, two molar equivalents of methylmagnesium bromide and 40 ml. of tetrahydrofuran is heated at reflux for about two hours. After cooling to about room temperature, carbon dioxide is bubbled in until formation of the carboxylate salt is complete. The resulting carboxylate salt, without isolation, is added under argon atmosphere to a solution of one molar equivalent of dimethyl copper lithium in tetrahydrofuran at −78°. After about 2 hours, 1 ml. of water is injected and the mixture allowed to rise to room temperature. The mixture is made acidic by the addition of dilute aqueous hydrochloric acid and then stirred until lactonization is complete. The crude 3-methylpent-2-eno-5-lactone is isolated by extraction with methylene chloride and then purified by distillation.

EXAMPLE 3

The process of Example 1 is repeated with the exception of using an equivalent amount of sodium but-1-ynoxide (NaOCH₂CH₂C CH) in place of 4-(tetrahydropyran-2'-yloxy)but-1-yne to yield 3-methylpent-2-eno-5-lactone.

EXAMPLE 4

A solution of 1 g. of 3-methylpent-2-eno-5-lactone in 50 g. of benzene is saturated with ethylene. The solution, while continuing to introduce ethylene, is irradiated using a medium pressure mercury vapor lamp (450 watts) with Pyrex filter for about four hours. Then the reaction mixture is evaporated under reduced pressure to yield 2,3-cycloethylene-3-methylpentano-5-lactone (III) which can be purified by distillation.

EXAMPLE 5

To a solution of 1 g. of 2,3-cycloethylene-3-methylpentano-5-lactone in ether is added two molar equivalents of methyl lithium in ether with stirring at about 0°. The mixture is stirred for about 60 minutes and allowed to rise to room temperature. The mixture is diluted with aqueous ammonium chloride and water and separated. The organic phase is washed with water, dried over sodium sulfate and evaporated under reduced pressure to yield the diol (IV) which can be purified by distillation.

A mixture of 1 g. of the diol (IV) and 5 ml. of acetic anhydride is heated at reflux for about two hours. The mixture is cooled and diluted with saturated NaCl, water and then ether. The organic phase is washed with brine and water, dried over sodium sulfate and evaporated under reduced pressure to yield the acetate (V).

A mixture of 1 g. of the acetate (V) and 0.1 g. of potassium hydroxide in methanol is stirred for about 2.5 hours. The mixture is diluted with water and then ether. The organic phase is washed with water, dried over sodium sulfate and evaporated to yield cis 2-(1'-methyl-2'-isopropenylcyclobutyl)-ethanol which can be purified by distillation.

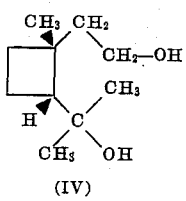   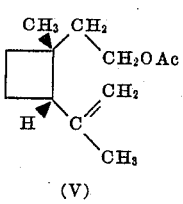

(IV)                  (V)

What is claimed is:

1. A process for the preparation of 3-methylpent-2-eno-5-lactone which comprises the steps of:
   a. the metallation of an acetylene of the formula:

$$HC \equiv C-CH_2-CH_2-OR$$

wherein R is hydrogen, metal or an acid labile organic group, by treatment with lower alkylmagnesium halide or lower alkyl lithium in an organic solvent inert to the reaction, said halide being bromide, chloride or iodide;
   b. treatment of the thus-obtained metalated acetylenic compound with carbon dioxide to form the corresponding acetylenic carboxylate salt;
   c. conjugate methylation of the acetylenic carboxylate salt at the β-carbon atom by treatment with a methylating reagent selected from the complex formed from the reaction of cuprous salt, solubilizing ligand and methylmagnesium bromide, chloride or iodide; dimethylcopper lithium; and methylcopper; and
   d. lactonization of the methylated product by treatment with acid to form said lactone.

2. The process according to claim 1 wherein the metallation is accomplished using methylmagnesium halide or ethylmagnesium halide and the organic solvent is an ether.

3. The process according to claim 2 wherein R is an acid labile organic group.

4. The process according to claim 1 wherein said solubilizing ligand is a secondary amine or tertiary amine.

5. The process according to claim 1 wherein said methylating reagent is dimethyl copper lithium or methylcopper, said reagent including a solubilizing ligand selected from tertiary phosphines, tertiary phosphites, secondary amines and tertiary amines.

6. The process according to claim 1 wherein said R is an acid labile organic group, said lower alkyl is methyl or ethyl and said organic solvent is an ether.

7. The process according to claim 2 wherein R is tetrahydropyranyloxy.

8. The process according to claim 2 wherein R is tetrahydropyranyloxy and said ether is tetrahydrofuran.

9. The process according to claim 2 wherein R is tetrahydropyranyloxy, said ether is tetrahydrofuran, said metallation being carried out from about room temperature to reflux and said methylation being carried out from about 0°C to −100°C.

10. The process according to claim 9 wherein said methylating reagent is dimethyl copper lithium.

* * * * *